United States Patent [19]

Booth

[11] Patent Number: 4,563,547
[45] Date of Patent: Jan. 7, 1986

[54] LOOP-START/GROUND-START LINE INTERFACE CIRCUIT

[75] Inventor: Paul N. Booth, Flanders, N.J.

[73] Assignee: AT&T Bell Laboratories, Murray Hill, N.J.

[21] Appl. No.: 472,936

[22] Filed: Mar. 7, 1983

[51] Int. Cl.$^4$ ............................................. H04M 1/74
[52] U.S. Cl. .......................... 179/16 AA; 179/170 NC
[58] Field of Search .......... 179/16 F, 18 AD, 18 AH, 179/170 NC, 70, 81 R, 78 R, 16 AA, 16 A

[56] References Cited

U.S. PATENT DOCUMENTS

| | | | |
|---|---|---|---|
| 3,721,768 | 3/1973 | Mazac et al. | 179/16 |
| 4,221,936 | 9/1980 | Vaughan | 179/18 AD |
| 4,283,604 | 8/1981 | Chambers, Jr. | 179/70 |
| 4,310,725 | 1/1982 | Mehaffey | 179/18 AD |

OTHER PUBLICATIONS

Laude, "A Monolithic Subscriber Line Interface Circuit", IEEE J. Solid-State Circuits, vol. SC-16, No. 4, pp. 266-270, 8/1981.
Pace, "A Monolithic Telephone Subscriber Loop Interface Circuit", IEEE J. Solid-State Circuits vol. SC-16, No. 4, pp. 270-278, 8/1981.
Aull et al., "A High Voltage IC for a Transformerless Trunk and Subscriber Line Interface", IEEE J. Solid-State Circuits, vol. SC-16, No. 4, pp. 261-266, 8/1981.
Davis et al., "A Hybrid Integrated Trunk and Subscriber Line Interface", IEEE International Solid-State Circuits Conference Digest of Technical Papers, pp. 204-205, 2/1982.

Primary Examiner—James L. Dwyer
Attorney, Agent, or Firm—Charles Scott Phelan; Henry T. Brendzel

[57] ABSTRACT

A switchable common mode reference circuit for tip conductor and ring conductor line feed amplifiers provides a tip-ring common mode feedback reference for loop-start operations and a common mode fixed bias for ground-start operations. The functioning of the line feed arrangement is enhanced by using separately-sensed tip and ring current signals to control the switching function and by switching the line feed amplifiers between a current source mode for loop-start operation and a voltage source mode for ground-start operation.

13 Claims, 8 Drawing Figures

| STATES<br>CONTROLLER<br>OUTPUTS / INPUTS | IDLE | ORIGINATE | DIALING | TALK | DISCONNECT | |
|---|---|---|---|---|---|---|
| | | | | | FROM INTERFACE | AT PBX |
| | SEL/GS<br>TCL/OPEN<br>CKT 50/LO | SEL/LS<br>TCL/CLOSED<br>CKT 50/HI | SEL/LS<br>TCL/CLOSED<br>CKT 50 LO-HI | SEL/LS<br>TCL/CLOSED<br>CKT 50/HI | SEL/GS<br>TCL/OPEN<br>CKT 50/LO | SEL/GS<br>TCL/OPEN<br>CKT 50/LO |
| LOOP CLOSURE | OPEN | CLOSED | RECURRENT OPEN/CLOSE | CLOSED | OPEN | OPEN |
| RING GROUND | ABSENT | ABSENT | ABSENT | ABSENT | ABSENT | ABSENT |
| CIRCUIT 50 | LOW | HIGH | HIGH | HIGH | LOW | LOW |

LOOP-START/GROUND-START LINE INTERFACE CIRCUIT

TECHNICAL FIELD

This invention relates to a telephone line interface circuit having facility for switching its operation between loop-start and ground-start modes.

BACKGROUND OF THE INVENTION

Electronic telephone line interface circuits are known to provide battery feed, loop closure detection, and other functions. Lines requiring loop closure detection are sometimes called loop-start circuits because a telephone call initiated at a subscriber station by going off-hook causes the subscriber station to present a closed circuit to direct current. That condition is detected, e.g., in a serving local telephone switching office as an indication that the subscriber is initiating a call. Loop closure detection is subsequently employed in the local office to detect dialing pulses transmitted from a subscriber station. An example of this type of electronic line feed arrangement on a loop-start circuit is found in the copending application, Ser. No. 346,585, now U.S. Pat. No. 4,476,350, filed Feb. 8, 1982, of D. W. Aull and D. A. Spires, entitled "Battery Feed Circuit", and assigned to the same assignee as the present application. A U.S. Pat. No. 4,283,604 to C. W. Chambers, Jr. is another example of such an electronic line feed and interface circuit.

In telephone systems, there are also line circuits, e.g., those between a central office and certain private branch exchange (PBX) arrangements, wherein a call is initiated by applying ground to one conductor, e.g., the ring conductor, of a two-wire loop circuit when a call is initiated. This is called a ground-start circuit. The presence of ground on such a conductor, which had previously been electrically floating, is sensed at the central office as a signal of the subscriber action. Such arrangements are not directly useful in systems normally dependent on utilization of a loop-start mode of operation, and adapting interfaces are employed to accomplish translation between loop-start and groundstart. Examples of such translation circuits are a U.S. Pat. No. 3,721,768 to F. P. Mazac et al. and a U.S. Pat. No. 4,221,936 to B. J. N. Vaughan. It is also known alternatively, to employ a special ground-start line interface unit when waiting for call initiation; and, thereafter, to employ a loop-start line interface unit when awaiting dialing pulses.

In channel path treatment circuits in channel units, it is often necessary that certain signal functions be bypassed around the treatment circuits. It is, then, necessary to provide a line feed interface at points where the signaling bypass path is separated from the regular channel path. If such an interface is in a channel serving a PBX and faces the PBX, the interface must be adapted to accommodate both loop-start and ground-start functions.

SUMMARY OF THE INVENTION

An improved line interface unit is switchably modifiable to respond properly to signals from either a loop-start or a ground-start circuit. Logic is included in the line interface unit for controlling the switching in a timely fashion.

BRIEF DESCRIPTION OF THE DRAWING

A more complete understanding of the invention and its various features, objects, and advantages may be attained from a consideration of the following Detailed Description in connection with the appended claims and the attached drawing in which

DETAILED DESCRIPTION

Figure 1:
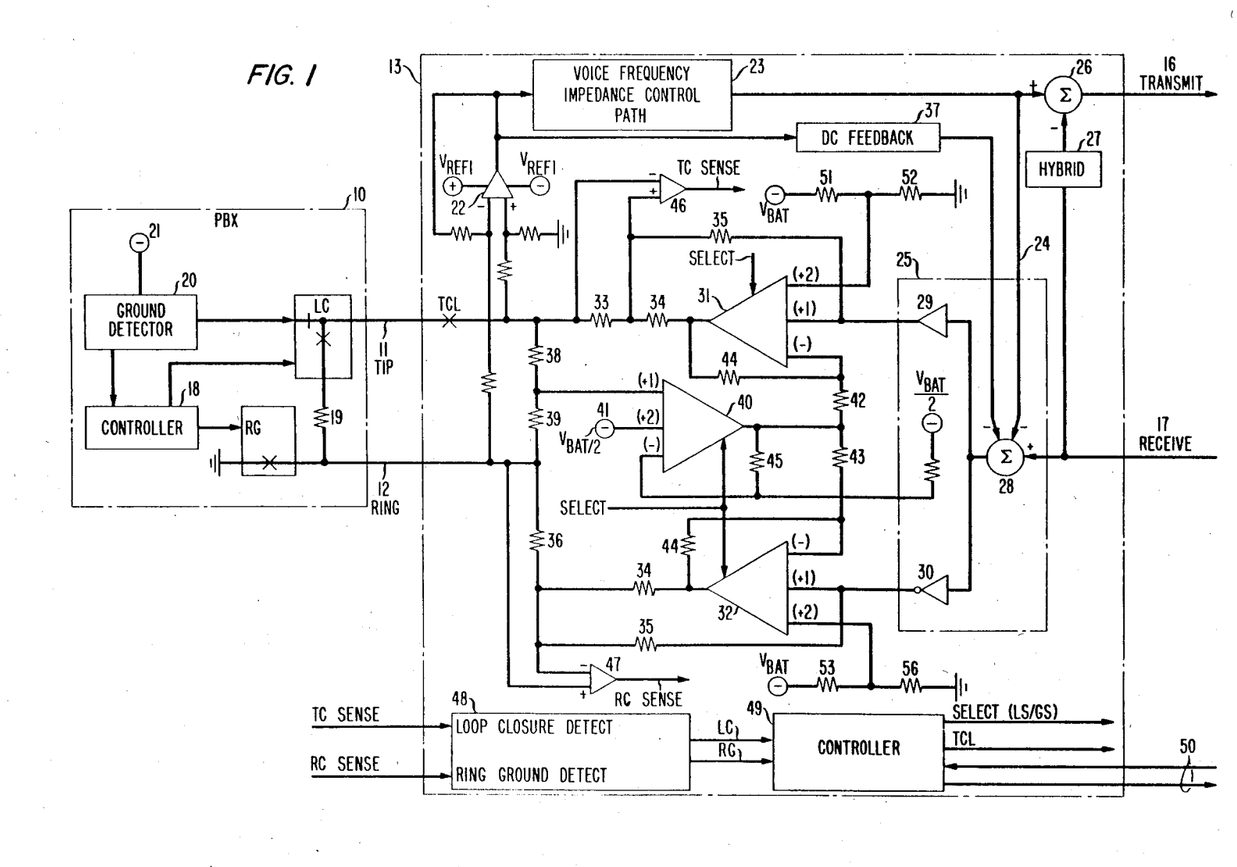
FIG. 1 is a diagram of an illustrative arrangement for interfacing a communication channel with telephone system subscriber equipment utilizing both loop-start and ground-start functions.

In FIG. 1, a private branch exchange (PBX) 10 is coupled through a two-wire telephone line circuit, including tip and ring conductors 11 and 12, to an interface circuit 13. That circuit provides battery line feed to the PBX, as well as performing a two-wire-to-four-wire translation with respect to a four-wire communication path. Included in interface circuit 13 is a two-wire transmit circuit 16 and a two-wire receive circuit 17. The latter circuits extend a communication path for voice signals toward a telephone central office (not shown). Interface circuit 13 is a part of a line interface unit at the edge of such an office or, alternatively, it is one interface in a channel unit which includes channel path treatment circuits (not shown), such as gain insertion, or equalization, which are provided on a four-wire basis.

Details of the PBX 10 comprise no part of the present invention and are, therefore, illustrated only partially in order to provide a schematic representation of subscriber loop closure and ring-ground functions often provided to a special service circuit extending to such a PBX. That special service circuit is, in FIG. 1, the conductors 11, 12 to which the interface circuit of the present invention must provide accommodation. A controller 18 in the PBX operates a first relay RG having make contacts (illustrated as an "X" mark across a lead) in a lead connected between ring conductor 12 and ground, and a second relay LC having a set of transfer contacts. The latter contacts include make contacts, which can be operated to connect a resistor 19 between the tip and ring conductors, and a set of break contacts (illustrated as a short line segment perpendicularly intersecting a lead) in a connection between the tip conductor 11 and a ground detector 20. Resistor 19 schematically represents a PBX user telephone set impedance as seen through the PBX. Detector 20 is otherwise connected at its opposite terminal to a negative voltage supply 21. That supply, and others to be indicated herein, are schematically represented by a circled polarity sign to indicate a lead connection to a supply (not shown) of the polarity indicated and having a terminal of opposite polarity connected to ground.

Information signals flowing from the PBX 10 toward the central office, pass along the tip and ring conductors, and are, at the interface circuit 13, applied to the noninverting and inverting inputs, respectively, of a differential signal amplifier 22. Series input coupling resistors and bias and feedback resistors associated with amplifier 22 are arranged so that the common-mode input range of the amplifier is not exceeded under normal operating conditions, and so that the amplifier output voltage represents a fraction, e.g., 0.14, of the differential input voltage. The supply voltages $\pm V_{REF1}$ are illustratively $\pm 15$ volts.

An output of that amplifier is coupled through a voice frequency impedance control path 23 to one input of an analog signal summing circuit 26. The path 23 advantageously includes a series combination (not shown) of capacitor and resistor coupling the output of amplifier 22 to an input of an operational amplifier (not shown). This arrangement blocks direct current coupling to circuit 26 and provides attenuation of residual 60-Hz hum that may be present on conductors 11 and 12. A negative feedback connection 24 to the interface officeside input enables the interface to present a voiceband frequency impedance of approximately 900 ohms resistance in series with a capacitance of about 2 microfareds to the tip and ring conductors. Summing circuit 26 is used as a compromise canceler in association with an electronic hybrid 27 to be described.

Incoming signals, flowing in the reverse direction from the central office toward the PBX 10, appear on the two-wire receive circuit 17 and are applied to an input of another analog summing circuit 28 which partially represents a differential amplifier and signal combining circuit 25 to be described. An output of the summing circuit 28 is applied through separate unity gain amplifiers 29 and 30, the latter providing a signal inversion, to a first noninverting input ($+1$) of each of two amplifiers 31 and 32, respectively. These amplifiers, which will be further described in greater detail, are switchable-input operational amplifiers, and are connected in an electronic battery line feed arrangement for performing both the line feed function and the received signal coupling to the tip and ring conductors.

The amplifiers 31 and 32, and their associated gain-determining resistances, are the same. It will be seen in subsequent discussion of details of circuits, such as 37 and 28, that signals coupled to summing circuit 28 come from circuits operating at much lower voltage levels than the voltage levels of amplifiers 31 and 32. Accordingly, gain in amplifiers 31 and 32 must be sufficient to provide adequate current in response to available low voltage signals for enabling operation on the longest loops to be served without risk of amplifier instability and for converting low-level signals (DC) to high-level signals, i.e., loop current. Each amplifier has a series output resistor 34 as well as feedback resistors 35 and 44 connected from opposite ends of resistor 34 to noninverting ($+1$) and inverting ($-$) inputs, respectively. Amplifiers 31 and 32 are thus connected through their ($+1$) inputs as voltage-controlled current sources, or transconductance amplifiers, which determine the amplitude and polarity of line current in the tip and ring conductors. As current sources, these amplifiers each presents to the tip and ring conductors a high output impedance that is then, by appropriate negative feedback, reduced to the desired design requirement levels for both low frequency and high frequency ranges of signals to be transmitted or received. A pair of surge resistors 33 and 36 actually connect the output resistors 34 of those amplifiers to the tip and ring conductors, respectively. The surge resistors have a small resistance, e.g., about 50 ohms each; and, together with similar resistances for resistors 34, perform a current limiting function, under surge or lightning conditions, in conjunction with a diode clamp circuit (not shown) to ground and $V_{BAT}$. Since surge resistors 33 and 36 are in series with the tip and ring conductors, they also provide a medium for directly sensing loop current magnitude, as will be described.

The amplitude and sign of the signals provided from summing circuit 28 to drive amplifiers 31 and 32 are a function of the received signal level from two-wire circuit 17 and of feedback signals provided to the circuit 28 from the output of amplifier 22 by way of the control path 23, and by way of a direct current (DC) feedback circuit 37, which will be described. Amplifier 22 is so coupled to conductors 11 and 12 as to make circuit 37 provide negative feedback. In addition, circuit 37 is advantageously arranged to present to direct current and frequencies below about 200 Hz an impedance, e.g., of about 200 ohms, that is much lower than that produced by path 23. This assures band separation between voice and signaling for path 23 and circuit 37.

The hybrid 27 and summer 26 perform a hybrid-canceler function. A component of the signal from receive circuit 17, which is coupled through amplifiers 25, 31, and 32 to conductors 11 and 12, leaks through amplifier 22 and path 23 to summer 26. A similar component is synthesized with opposite phase by hybrid 27 and applied to summer 26 to cancel approximately the mentioned leakage component. This type of compromise canceling is well known in the art and comprises no part of the present invention. One such arrangement is shown, for example, by P. C. Davis et al. in their paper, "A Hybrid Integrated Trunk and Subscriber Line Interface," 1982 *IEEE International Solid State Circuits Conference Digest of Technical Papers*, Feb. 1982, pages 204–205.

A potential divider, including equal resistors 38 and 39, connected in series between the tip and ring conductors, includes a center tap which is connected to a first noninverting input connection ($+1$) of a common mode circuit amplifier 40. That amplifier, illustratively another switchable input operational amplifier, has its inverting input connection biased, through a connection from the difference amplifier 25, at a negative voltage which is advantageously one-half of an office battery supply $V_{BAT}$, which is, illustratively, $-85$ volts. The output of amplifier 40 is fed back to its inverting ($-$) input through a resistor 45; and it is also applied through equal resistors 42 and 43 to inverting inputs of amplifiers 31 and 32, respectively, to provide common mode reference voltage thereto.

Common mode impedance of the interface circuit is determined by the gain of amplifier 40, given an amplifier gain for 31. That amplifier 40 gain is determined in the loop-start mode by the ratio of feedback resistor 45 and the output resistance of circuit 25, as will be described. That amplifier 40 gain is fixed at a level sufficient to sink the largest anticipated longitudinal tip-ring current without either damaging the amplifiers 31, 32, and 40, or causing nonlinearities. Thus, when the tip and ring conductor amplifiers 31 and 32 are operating in their current source mode, just described, the average voltage difference between the tip and ring conductors is compared to the reference voltage $V_{BAT}/2$; and the difference is applied by amplifier 40 as a common mode reference signal to the tip and ring amplifiers, thereby forcing the average tip and ring voltage to be $V_{BAT}/2$.

Current level in each of the tip conductor 11 and the ring conductor 12 is separately sensed as a voltage difference across a corresponding one of the surge resistors 33 and 36. For that purpose, the voltages with respect to ground at the two ends of surge resistor 33 are applied to the noninverting and inverting inputs, respectively, of an amplifier 46, which produces an output TC SENSE signal. A like connection is provided through another amplifier 47 for producing an RC SENSE signal in response to the voltage difference across surge resistor 36. Noninverting inputs of amplifiers 46 and 47 are connected to high voltage ends, for counterclockwise loop current as illustrated, of their surge resistors to provide proper operation of logic circuits driven by those amplifiers.

Amplifiers 46 and 47 each performs a voltage level-shifting function in which the voltage difference across a surge resistor, one of which surge resistor differences is typically at a relatively higher voltage level with respect to ground than the other, is shifted to a common low voltage level. That shift is accomplished without loss of the individual resistor voltage difference signal magnitude, which is relatively small. This facilitates utilization of that voltage difference signal in low voltage logic and analog circuits which are more conveniently available and which are less expensive than circuits operating at the aforementioned higher voltage level of $V_{BAT}$. Such a high voltage level is typically about the $-85$-volt level needed to supply loop current through maximum loop resistance, whereas a voltage level for many conveniently available logic circuits is typically about 5 volts for digital circuits in the present state of the art, and 15 volts for analog.

The TC and RC SENSE signals are applied to different inputs of a detector 48, which includes logic circuits, to be described, for separately determining the tip conductor and ring conductor current level information either when the loop circuit including those conductors is closed, or when the ring conductor is connected to ground. Detector 48 produces binary signal levels indicating whether or not the loop is closed and whether or not the ring conductor is grounded; and those signals are applied as LC and RG signals, respectively, to a controller 49. That controller also has a signaling circuit 50 which extends either to the central office, or to a channel unit of which the interface circuit is a part, for sending and receiving certain direct-current signaling information which is not easily transmitted otherwise through the transmit and receive circuits 16 and 17.

Figure 2:
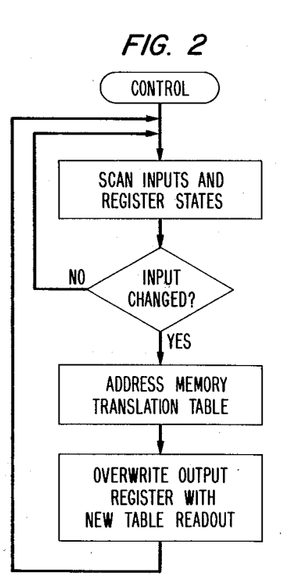
FIG. 2 is a process flow diagram of an illustrative operating sequence for a microcontroller in the interface unit of FIG. 1.

One suitable implementation for controller 49 is the TMS-1000 microcontroller made by the Texas Instruments Corporation. Controller 49 advantageously operates as a code translator on a fixed interactive process in which it is responsive to different combinations of the states of the LC and RG signals and of direct current level signals on the incoming portion of signaling circuit 50. In response to those inputs, the controller produces three outputs of interest in connection with operation of interface circuit 13. Those outputs are a loop-start/-ground start SELECT signal, a tip closed signal TCL, and direct current level signals on the outgoing portion of signaling circuit 50. As shown in the controller 49 process flow diagram of FIG. 2, the controller recurrently scans its input connections to detect changes in signals on any one of them. Upon detecting such a change, the new combination of input signal states is utilized to address a table in memory in the controller to produce appropriate corresponding new states for the aforementioned three output signals. Those new signal states are overwritten into an internal register of the controller to establish the controller output states. A process diagram, or truth table, for this controller operation in a typical call sequence is presented in FIG. 3 and will be subsequently described in greater detail. For the present, however, each of the three outputs will be briefly characterized.

The signal output on circuit 50 is a direct current level that is high for detected loop closures or ring grounds and low otherwise. Thus, it includes a regenerated form of dial pulsing signals received from the PBX 10 as a result of recurrent loop closures detected during a dialing operation. The central office distinguishes among different significances of different ones of the circuit 50 high direct current level signals according to their respective durations and the sequence in which they appear, all as is well known in the art. A TCL output of controller 49 actuates a relay (not shown) which controls a set of make contacts TCL in the tip conductor portion of the interface circuit 13. The TCL signal is provided to cause the closing of those contacts in response to a detected ring ground and whenever interface circuit 13 is being operated in its loop-start mode. Those TCL contacts are open during circuit-idle conditions in a ground-start mode, to be described, when there is no call in progress which produces voice signals on the tip conductor; and they are opened to indicate a forward disconnect function, i.e., when a call that had been set up is terminated by a party that is connected on the office side of the interface 13. Finally, a controller output SELECT signal is produced for controllin9 the states of the amplifiers 31, 32, and 40 to one or the other of two switchable input operating states, as will be subsequently further described.

When the interface circuit 13 is operating in the loop-start mode, contacts TCL are closed. Amplifiers 31 and 32, in cooperation with the common mode feedback path, including amplifier 40, provides a longitudinal current sink, through amplifiers 31 and 32, as well as providing a common mode reference for the tip and ring amplifiers 31 and 32, as already mentioned.

However, when the interface circuit must accommodate a ground-start function, the TCL contacts are normally open so that, when a ring ground is detected in the interface circuit, it can be acknowledged by closure of the TCL contacts. In this condition, with the TCL contacts open, and the amplifiers 31 and 32 operating as voltage-controlled current sources, i.e., constantcurrent supplies for conductors 11 and 12, the outputs of amplifiers 31 and 32 on conductors 11 and 12 are at, e.g., $-5$ volts and $-80$ volts, respectively. Upon occurrence of a ring ground, there would be interaction between the outputs of the amplifiers 31 and 32, through the surge resistors 33 and 36 and the voltage-dividing resistors 38 and 39, which would render ground-start operation impossible. The reason is that, upon the appearance of the ring ground indicating that a PBX subscriber is initiating a call, the resulting current flow from the ring conductor into the interface circuit would pull the common terminal between resistors 36 and 39 positively toward ground. That tends, because divider resistors 38 and 39 average tip-ring voltage difference, to alter input (+1) bias in amplifier 40 in the same direction and change the common mode reference supplied to amplifiers 31 and 32. This moderates the effect on the mentioned terminal by tending to pull it negatively, but it also drives the terminal between resistors 33 and 38 negatively away from ground enough to maintain an average tip-ring voltage of $V_{BAT}/2$. However, if the contacts TCL were closed to acknowledge detection of the ring ground, the required responsive ground condition on the tip conductor would not be available; and so acknowledgement would be impossible.

The foregoing tip-ground response problem is solved by changing the states of the switchable input operational amplifier 40 so that it is responsive to a different one of its noninverting inputs and, thereby, has altered characteristics. To this end, the change in the SELECT signal upon detection of ring ground during ground-start operation causes the amplifier 40 to be responsive to its (+2) input connection, which is connected to negative $V_{BAT}/2$, i.e., the negative supply 41 in FIG. 1. It will be recalled that a similar negative bias is also provided to the inverting (−) input through output resistors of differential amplifier 25, as will be described. Those resistors, with resistor 45, maintain gain of amplifier 40 at much the same level in both the loop-start and ground-start modes. The common mode feedback is disengaged under these conditions of groundstart operation; and a fixed longitudinal signal, corresponding to the amplitude negative $V_{BAT}/2$, is applied to the reference inverting inputs of amplifiers 31 and 32. This makes those references have fixed values which are independent of any possible voltage shift as a result of the appearance of the ring ground.

It has been found that, in the ground-start mode (SELECT (+2)) for amplifier 40, the common mode impedance which was low to sink longitudinal currents in the loop-start mode, is now high as the common mode feedback is disengaged; and amplifiers 31 and 32 are still in a current source mode. This causes the interface 13 to be susceptible to high external longitudinal voltages, instead of currents, which could possibly cause amplifier saturation and introduce nonlinearities in its operation, because the amplifiers would try to work outside their normal operating range. Such nonlinearity could possibly cause cross-talk to other circuits in any system to which the illustrated interface circuit 13 is connected, or to which circuit 13 is parallel. However, in FIG. 1, the ground-start SELECT signal state is also simultaneously applied to amplifiers 31 and 32 to switch them to be responsive to their (+2) inputs instead of their (+1) inputs. The foregoing ground-start operation is then further enhanced because the switching of effective inputs on the amplifiers 31 and 32 removes the positive feedback effect of resistors 35, and changes the mode of operation of those amplifiers to that of voltage-controlled voltage sources, i.e., constant-voltage supplies to conductors 11 and 12, at the same time that the mode of operation of amplifier 40 is changed. Consequently, amplifiers 31 and 32 present substantially lower output impedances in the ground-start mode than in the loop-start mode; and their series resistances 33, 34 and 36, 34, respectively, dominate the impedance presented to conductors 11 and 12. Thus, the circuits of amplifiers 31 and 32 independently present to tip and ring conductors 11 and 12 approximately the same impedances to ground as they had presented in the loop-start mode, and are able to sink longitudinal-type currents. Absent that positive feedback of the loop-start mode, amplifiers 31 and 32 stay in their linear operating range for all expected ground-start operating signal amplitudes and, thereby, avoid the aforementioned crosstalk risk.

The (+2) inputs of amplifiers 31 and 32 are advantageously connected to fixed voltage levels for forcing the amplifier outputs to the optimum desired output levels for the ground-start function. For this purpose, the (+2) input of amplifier 31 is connected to a tap on a voltage divider, including resistors 51 and 52, connected in series between ground and a negative supply $V_{BAT}$. Resistors 51 and 52 are proportioned to make the amplifier input negative with respect to ground, for example, −5 volts for a negative supply of −85 volts. A similar voltage divider, including resistors 53 and 56, is provided for the (+2) input of amplifier 32; but in this case, the resistors are proportioned to bias the amplifier input at a much larger negative voltage, such as, for example, −40 volts. The value of the latter bias is selected to assure the availability both of ground at the output of amplifier 31, i.e., the common terminal between resistors 33 and 38, and of sufficient current output from amplifier 32 for proper ring-ground detection on the longest loop circuit likely to be served by the interface circuit. Now, because amplifier 31 is operating as a voltage source, ground is present at that common terminal, whether or not ring ground is present. The occurrence of ring ground simply terminates current in resistors 38 and 39 and increases current in resistor 36.

Figure 3:
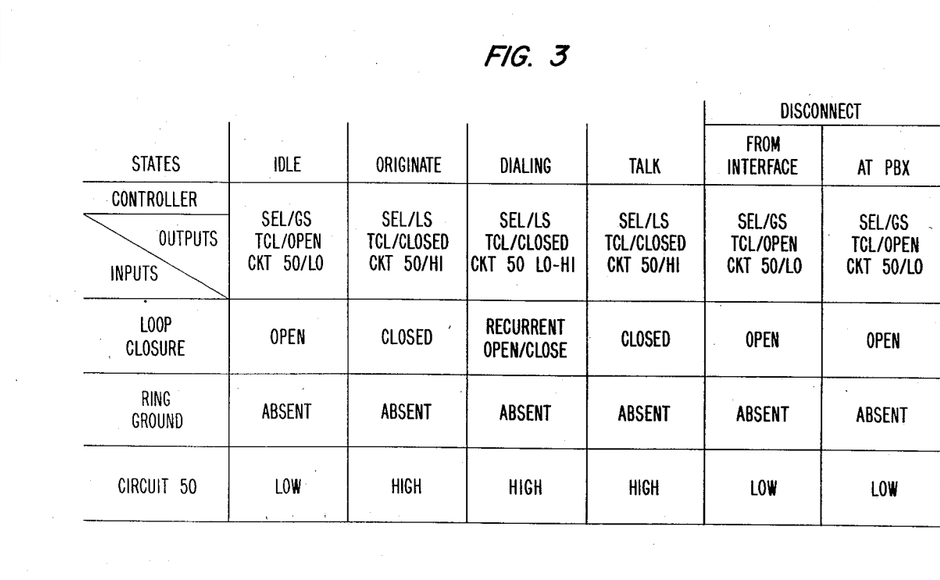
FIG. 3 is a truth table illustrating a typical call sequence.

FIG. 3 is an operation sequence diagram, or truth table, for a typical application of the interface circuit of FIG. 1. This figure illustrates the ability of that interface to transfer reversibly between a loop-start mode and a ground-start mode on a signal interactive basis.

The illustrative process of FIG. 3 represents a call which is initiated from a calling party extension telephone at the PBX 10. Thereafter, communication is established through interface 13 and the central office to a called party, a talking interval takes place, and then the call is terminated by a disconnect by either party to the call. Various states of that operating sequence are named across the top row of FIG. 3. Controller 49 output signal states that define each interface configuration, once stabilized, are listed just below each state name. The left-hand column of the FIG. 3 diagram lists controller 49 inputs. In the same row with each input, are function states of each such input for the respective states of the sequence. This sequence is summarized below in somewhat greater detail.

In the idle state, controller 49 outputs include a SELECT signal in the ground-start signal state, a TCL signal which opens the TCL relay contacts in the tip lead, and a low direct current level on the outgoing part of circuit 50. Under these idle conditions, and while awaiting occurrence of a ring ground, the tip-ring loop is open, ring ground is absent, and the DC level on the incoming portion of signaling lead 50 is low.

When the calling party initiates a call, the RG relay in PBX 10 grounds the ring lead, as previously described. In response thereto, the increased potential difference across surge resistor 36 causes detector 48 to actuate the RG input lead to controller 49, indicating the presence of the ring ground. Controller 49 sends a high signal on outgoing lead 50. After the office returns a confirming high signal, controller 49 actuates the TCL lead to close the TCL contacts and return a tip ground condition to the PBX. PBX detector 20 detects that condition and causes controller 18 to activate the LC relay to operate its transfer contacts and close the tip-ring loop through resistor 19. The RG relay is also disabled at the same time to remove ring ground. That action initiates counter-clockwise (as illustrated in FIG. 1) loop current, which is sensed by amplifiers 46 and 47. They cause detector 48 to actuate the LC input lead to controller 49, and it then actuates the SELECT lead to transfer the interface into the loop-start mode. The interface is now in its stable "originate" mode.

Dial tone is returned from the office and coupled by circuits not shown to the tip and ring conductors. When the calling party begins dialing, controller 49 receives the corresponding loop opening and closing indications from detector 48 and relays corresponding low/high changes in direct current voltage levels back toward the central office over signaling circuit 50. The central office includes timing functions for distinguishing between dial pulsing and busy/idle conditions, as is well known in the art. As long as the confirming high-ground signal is present on incoming lead 50, controller 49 recurrently switches the interface back to the ground-start mode on each opening of the loop.

On completion of dialing, the loop remains closed; and the high signal continues to be provided to the office on circuit 50. The interface is now in condition for talking; and, along with the line feed current to the tip-ring loop, appropriate voice signals are coupled to the loop when the called party answers. This represents the talking phase of the illustrative sequence.

Upon termination of the talking phase by a disconnect initiated, for example, by the party which is connected through the central office, a low direct current level is supplied on signaling circuit 50 from the direction of the office to indicate that occurrence. In response, controller 49 changes the SELECT signal lead to the ground-start state, the TCL lead to open the tip conductor, and the outgoing part of circuit 50 to the low state (acknowledging disconnect). The opening of the tip conductor terminates loop current, and that is detected in PBX 10 (by a circuit not shown). Controller 18 then disables the LC relay and, thereby, opens the loop by disconnecting resistor 19. It should be noticed now that the controller input and output signal states (shown in the "from interface" column in FIG. 3) are the same as those shown for the idle state. The interface unit 13 is, therefore, in a condition to await new activity.

Similarly, if the disconnect had been initiated from the PBX extension user, that action causes the PBX to disable its relay LC and open the tip-ring loop. This loss of loop closure is sensed by detector 48, which supplies a low LC signal to controller 49; and that controller, in turn, switches its outputs for use within the interface in the manner just described, and also forces the outgoing signaling circuit 50 to the low voltage condition to inform the central office of the disconnect. Controller 49 inputs and outputs are now in the same condition as if disconnect has been initiated from the office side of the interface, and that is the same as the idle state.

If a call origination is initiated from the central office side of the line interface, and assuming no ring-ground indication from detector 48, a high signal is received on circuit 50 and causes controller 49 to switch to the loop-start mode with TCL closed; and SELECT goes to the loop-start state. Ringing signals from the central office are coupled through circuits not shown to the tip-ring loop for activation of a PBX 10 extension telephone station set. When the appropriate PBX station user takes the station off-hook, controller 18, in FIG. 1, activates the relay LC to close the loop; and the call sequence proceeds in much the same fashion as previously described in connection with FIG. 3 for a PBX call origination. The principal exception is that, without the appearance of dialing pulses, controller 49 applies a high DC level to signaling circuit 50 for directly placing the interface into the talk state illustrated in FIG. 3.

It will be apparent to those skilled in the art that interface 13 operates in only the loop-start mode if a continuous high signal is applied on the incoming lead of circuit 50 when no ring-ground signal is present. Consequently, the interface 13 can then serve a subscriber loop that requires only the loop-start function.

Figure 4:
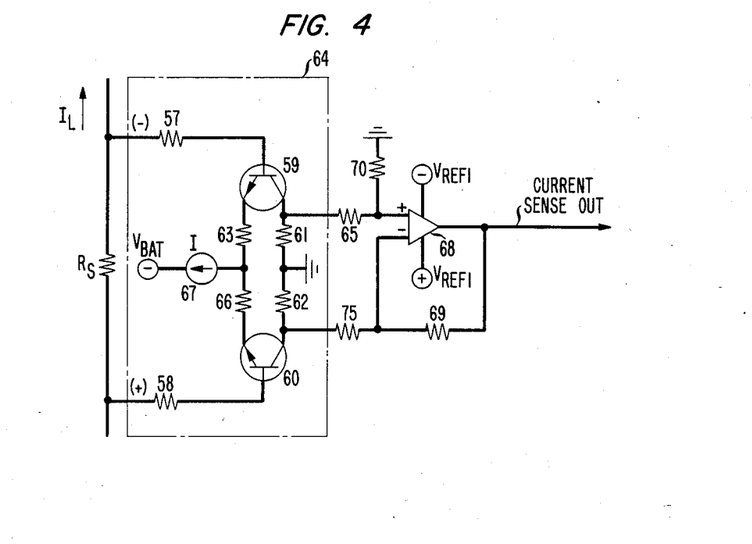
FIG. 4 is a diagram of a current-sensing circuit utilized in FIG. 1.

FIG. 4 illustrates a preferred form of the circuits employed for current sensing amplifiers 46 and 47. This circuit is a current-to-voltage converter. It converts the voltage drops across surge resistors, which are, at any given time, at opposite ends of the $V_{BAT}$ range, to a common low voltage range suitable for driving less expensive low voltage digital logic and analog circuits without sacrificing differential gain. Loop current $I_L$, flowing in one of the surge resistors $R_s$, develops a voltage difference thereacross, which is applied through two current limiting resistors 57 and 58 to inverting and noninverting input connections of the amplifier. In connection with FIG. 4, it is assumed that the ring current sensing amplifier 47 is illustrated with counterclockwise loop current $I_L$, and that the input through resistor 58 is the noninverting input connection of the overall sensing amplifier illustrated.

For proper operation of logic 48, which is controlled by the sensing amplifiers 46 and 47, the amplifiers must be connected so that loop current flows in the same direction between their noninverting and inverting inputs. The two inputs are applied to respective base connections of NPN transistors 59 and 60, which are connected in a differential amplifier 64 operating across the office battery supply $V_{BAT}$. Collectors of the two transistors are connected to ground through resistors 61 and 62. Separate resistors 63 and 66 connect emitters of the two transistors to the negative battery supply through a common current source 67. That current source and resistors 61–63 and 66 are chosen to keep the transistor collector voltages with respect to ground very small, e.g., about −2 volts. The differential amplifier configuration makes all input voltage differences, whether at the high or the low end of the loop voltage range, available between the collectors at a voltage level close to ground without disturbing electrical conditions on the tip-ring loop, and without significantly reducing the magnitude of the difference.

Voltages at the transistor 59 and 60 collectors are applied through respective resistors 65 and 75 to noninverting and inverting inputs, respectively, of an operational amplifier 68 connected for linear operation. Resistors 65 and 75 provide isolation to prevent amplifier 68 from loading the amplifier 64 transistors, and they also help to determine the gain through amplifier 68. Amplifier 68 operates off positive and negative versions of the reference supply $V_{REF1}$ (e.g., of approximately 15 volts) to convert the input difference voltage to an unbalanced form with respect to ground. The output of amplifier 68 is the current sense signal and corresponds to the RC SENSE signal in FIG. 1, since FIG. 4 was assumed to show amplifier 47. Amplifier 68 is provided with equal resistors 69, 70 for feedback to the inverting input and for applying a reference ground to the noninverting input. These assure balanced response to the difference voltage inputs from amplifier 64.

Figure 5:
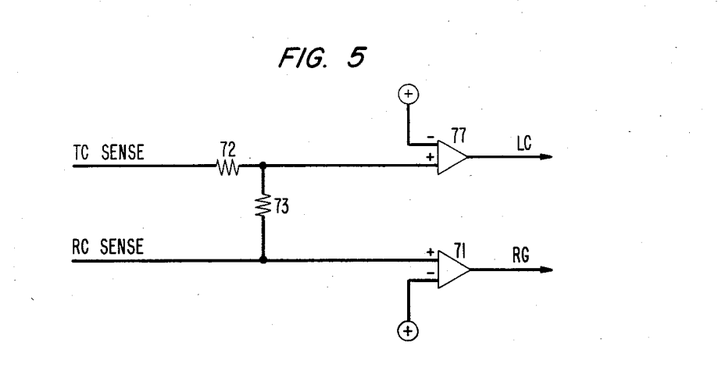
FIG. 5 is a diagram of a signal detecting circuit utilized in FIG. 1.

FIG. 5 includes a diagram of the FIG. 1 detector 48. This circuit detects outputs of current sensing amplifiers 46 and 47 with respect to predetermined threshold voltages. The object of the detecting is to indicate separate occurrence of either a loop closure, by a high signal on an output lead LC, or a ring ground, by a high signal on an output lead RG while the lead LC is low. These levels occur, regardless of the direction of tip-ring loop current.

The RC SENSE input signal is high for either a ring ground or a loop closure occurrence and low otherwise, and that signal is compared to, illustratively, a positive 0.5-volt reference at the inverting input of a comparator amplifier 71. Thus, whenever the RC SENSE signal exceeds the value of the positive reference for amplifier 71, the output of that amplifier steps to a higher level than it had before that time to indicate the occurrence of a ring ground.

For sensing loop closures, the TC SENSE and RC SENSE signals are applied to opposite ends of a potential divider including equal series-connected resistors 72 and 73. A midpoint connection on that potential divider is applied to the noninverting input of a further comparator 77, which is referenced to, e.g., a positive 1.5-volt supply. The divider presents to the comparator the average of the tip and ring conductor sensed signals thus canceling effects of unwanted longitudinal currents. If loop current is present, the outputs of amplifiers 46 and 47 are approximately the same; and their average is equal to one of them. If only ring ground is present, it actuates comparator 71; but the average is too small to actuate comparator 77. When the average value of the tip and ring sensed signals exceeds the reference, a change takes places in both the LC lead output of amplifier 77 and the RG lead output of amplifier 71 to indicate to the controller that loop closure has occurred. If the LC lead is high, indicating loop closure, controller 49 provides the same output response, regardless of the state of the RG lead.

The FIG. 5 detector and associated sense amplifier arrangement offers an additional advantage. Because the amplifiers 46 and 47 are responsive to currents in the line feed path, rather than a voltage in, e.g., the DC feedback path, their outputs are essentially independent of long time constant effects of a low-pass filter often found in such a feedback path. It is, therefore, practical to detect loop closures representing dial pulses, and to do so essentially free of pulse distortion that would be caused by such a filter.

Figure 6:
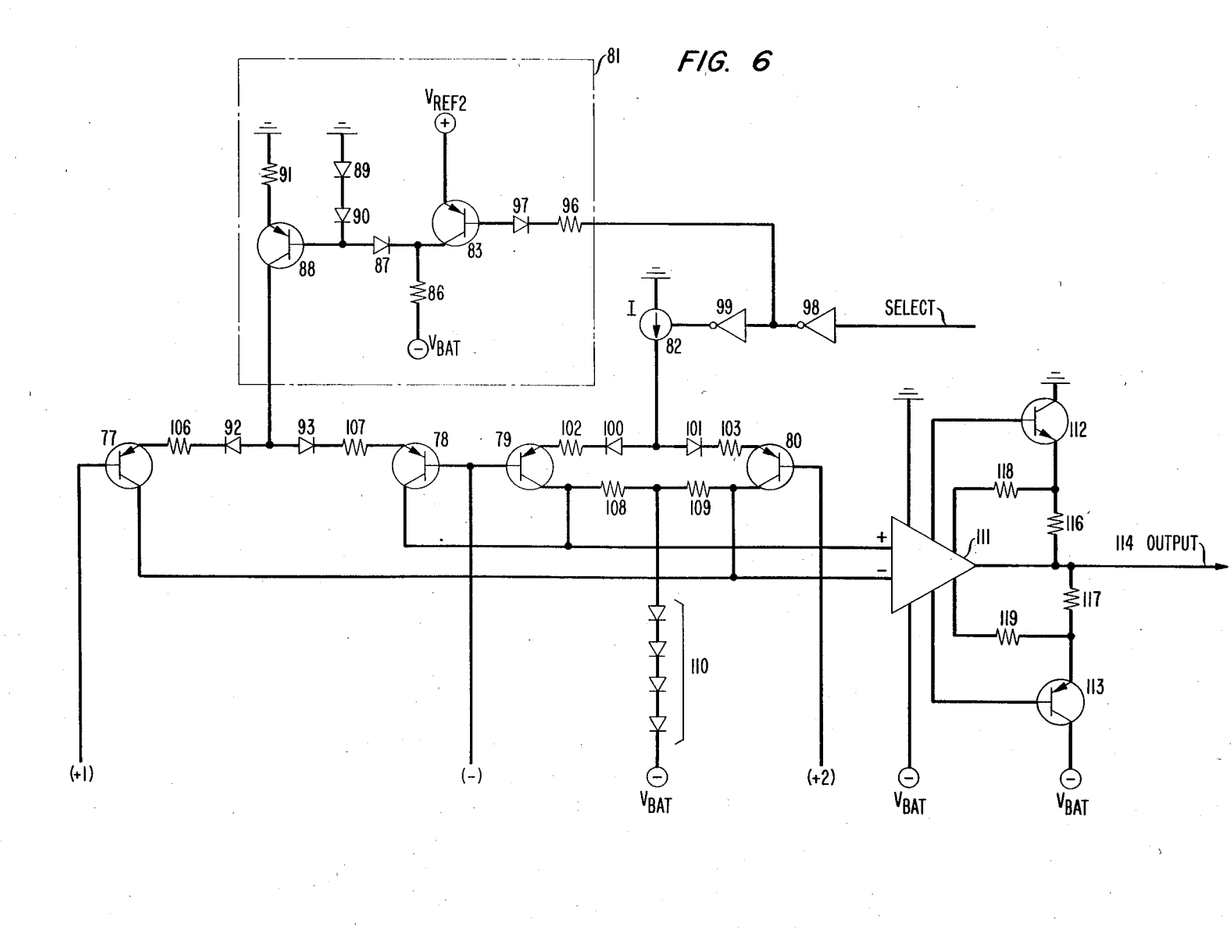
FIG. 6 is a diagram of a switchable input operational amplifier utilized in FIG. 1.

FIG. 6 is a more detailed diagram of the switchable input operational amplifiers illustratively employed for amplifiers 31, 32, and 40 in the circuit of FIG. 1. These provide operation over a band nearly three orders of magnitude greater than the band of signals to be transmitted, e.g., a bandwidth of about 2 MHz for a voice signal system. Input connections, indicated by reference characters in parentheses, correspond to the same input connections with the same designations in the amplifiers indicated in FIG. 1. These inputs are applied to base connections of two pairs of PNP transistors 77, 78 and 79, 80 connected in two separate unity gain, differential-input, amplifier arrangements. Separate current sources 81 and 82 are included in the common portions of the emitter current paths of the respective transistor pairs. Each current source includes an input PNP transistor 83, which has its emitter electrode connected to a positive voltage reference $V_{REF2}$, such as +5 volts, and its collector electrode connected through a resistor 86 to the negative terminal of $V_{BAT}$. The collector is also coupled through a diode 87 to the base of an output PNP transistor 88, and that base is clamped at a voltage level of two diode-junction drops below ground as long as the diode 87 is conducting. Diode 87 is poled for forward conduction in the same direction as the emitter-base junction of transistor 88. The emitter of transistor 88 is connected to ground through a resistor 91; and the collector of transistor 88 is coupled through a pair of isolation diodes, such as the diodes 92 and 93, and a pair of resistors 106 and 107, to the respective emitters of the transistors in one of the input stage transistor pairs previously mentioned.

SELECT signals from controller 49 are applied in either the inverted or the true form to the current sources 81 and 82, respectively. Within a particular current source, that SELECT signal is coupled through a resistor 96 and a diode 97 to the base of the input transistor 83. Diode 97 is poled for conduction in the same direction as the base-emitter junction of that input transistor. Thus, it can be seen that the SELECT signal is applied through a first inverter 98 to the current source 81; and when the inverted SELECT signal is low, the input transistor is turned on and conduction therethrough blocks the diode 87 so that output transistor 88 is turned off. Amplifier input transistor pair 77, 78 is thus disabled.

However, that same SELECT signal is also applied through a further inverter 99 as a high level signal; and it has the opposite effect on current source 82. That is, the input transistor thereof is turned off; the output transistor 88 is turned on; and current is provided through a diode pair 100, 101 and a resistor pair 102 and 103 to the respective emitters of transistors 79 and 80. It is apparent that a low voltage level SELECT signal has the opposite effect of disabling current source 82 and enabling current source 81 to supply operating current to the input transistor pair 77, 78. It is, therefore, apparent that the operating characteristics of the overall amplifier, illustrated in FIG. 6, will be determined by any external feedback or other connections to the input of the selected pair of transistors of the amplifier; and characteristics determined by similar connections to the input of the nonselected pair will be ineffective until the SELECT signal state is changed.

Diodes 92, 93 and 100, 101 block leakage current flow between bases of a disabled pair of the amplifier transistors. This protection is necessary because, in that disabled condition, the transistor pair is subject to large voltage swings between its input connections; and, absent isolating diodes, leakage currents could flow from, for example, the base electrode of transistor 77, through the resistors 106 and 107, to the base connection of transistor 78. The diodes provide the necessary voltage breakdown protection, e.g., of about 90 volts in the illustrative embodiment. Each of the isolating diodes just mentioned is poled for forward current flow in the same direction as the base-emitter junction of the associated transistor.

The amplifier input differential transistor pairs share the inverting input connection (−) to the bases of their respective transistors 78 and 79. The noninverting input (+1) is applied to the base of transistor 77, and the noninverting input (+2) is applied to the base of transistor 80. Inverting input connection transistors 78 and 79 share a common collector resistor 108, and noninverting input connection transistors 77 and 80 share a common collector resistor 109. Both transistor pairs share a common connection to the negative terminal of the supply $V_{BAT}$ through a series combination of four diodes 110.

The employment in the input differential transistor pairs of PNP transistors, with controllable current sources in their ground-emitter paths, provides a solid ground connection reference that is convenient for switching. In addition, when such an amplifier is employed to provide an electronic tip conductor ground, the amplifier must work closer to ground than the $V_{BAT}$ supply since the current source drop may be less than that of the drop across the four diodes 110. The current sources are advantageously located close to ground, so that the amplifier does not become latched in one state.

The inverting input transistor collectors for transistors 78 and 79 are connected to the noninverting input connection of an operational amplifier 111, which also works between the negative supply $V_{BAT}$ and ground. Similarly, the collectors of the noninverting input transistors 77 and 80 are applied to the inverting input connection of amplifier 111.

Some commercially available operational amplifiers, e.g., the MA-700 made by Analog Systems, are capable of working at the relatively high voltages represented by an office battery supply, such as $V_{BAT}$; but they are unable to supply adequate output current for all conditions which may arise. However, such amplifiers include additional output connections which are useful for controlling extra transistors to be applied to supplement the output current of the amplifier. This is the case illustrated for amplifier 111. Thus, NPN transistor 112 and PNP transistor 113 are connected in series with resistors 116 and 117 between the negative $V_{BAT}$ supply and ground. Transistor 112 is connected in series with resistor 116 between ground and the output lead 114 of amplifier 111. Similarly, transistor 113 is connected in series with resistor 117 between the negative supply and the output lead of amplifier 111. Base electrodes of transistors 112 and 113 are connected to appropriate outputs of amplifier 111 so that, for example, when the current on the main output lead 114 of amplifier 111 is increasing, the bases of transistors 112 and 113 receive a similar increase to drive 112 harder and reduce the drive to transistor 113. Under those circumstances, current is diverted from transistor 113 to lead 114 to supplement the output current of the amplifier 111. A decrease in the output of amplifier 111 results in a corresponding decrease in the supplement provided by action of transistor 112 and a diversion of current from lead 114 into transistor 113. Current limiting resistors 118 and 119 complete the connections for those two transistors to the amplifier 111.

The switchable input operational amplifier, as thus far described in FIG. 6, is advantageously employed for the line feed amplifiers 31 and 32 in FIG. 1. However, since the current requirements for the common mode feedback amplifier 40 are much less than those of the line feed amplifiers 31 and 32, amplifier 40 does not require the current supplementing output transistors 112 and 113, and such transistors can be omitted from those amplifier connections.

Figure 7:
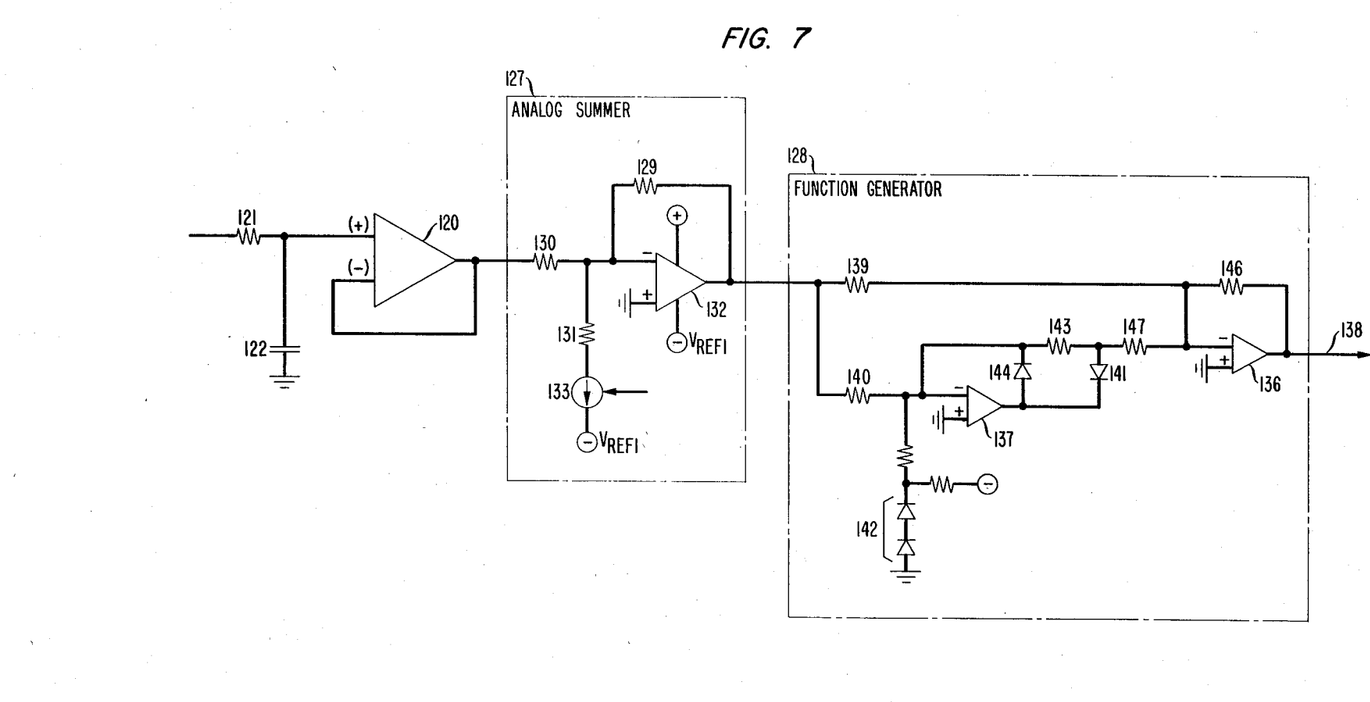
FIG. 7 is a diagram of a direct current feedback circuit utilized in FIG. 1.

FIG. 7 depicts the DC feedback circuit 37 employed in the interface circuit 13 of FIG. 1. This is a negative feedback circuit, and it controls the direct current dynamic response of the line interface circuit without disturbing the voice signal path to transmit circuit 16. Circuit 37 also determines the direct current steady state response by fixing both the maximum open-loop voltage during the idle state and the offset bias voltage for the tip-ring amplifiers 31 and 32. In addition, circuit 37 determines the loop current, load line characteristics.

The output of the difference amplifier 22 in FIG. 1 is applied to the DC feedback circuit at the input to a low-pass filter, including a resistor 121 and a capacitor 122. Filter impedance values are selected to provide filtering with a low cutoff frequency of approximately 1.5 Hz so that voice signals are essentially blocked; and low-frequency signaling, including direct current signaling, is passed, but severely attenuated. That filter fixes the dynamic direct current response, and its output is applied to the noninverting (+) input of a buffer amplifier 120 which has its output directly fed to its inverting (−) input to operate as a unity gain amplifier.

Output from amplifier 120 is applied through an analog summer 127 to a function generator 128. In the summer 127, three equal resistors 129, 130, and 131 are employed for determining the gain of an operational amplifier 132, which operates between plus and minus reference voltage $V_{REF1}$ of approximately ±15 volts. This amplifier has its noninverting input connection referenced to ground. The inverting input connection is coupled through the resistor 131 and a current source 133 to the negative terminal of the $V_{REF}$ supply. The gain of summer 127 is scaled in conjunction with other elements of the DC feedback path to set the DC output impedance of interface 13 to maximize the loop lengths that can be served by the interface. The level of bias for the summer is manually set by adjusting the operating level of the current source 133, in order to fix the direct current output levels of the tip and ring amplifiers 31 and 32, applied between tip and ring conductors at no load, i.e., in the loop-start mode with no actual speech signals, to a predetermined level. That also fixes the maximum open loop voltage level at idle and is advantageously about ten volts less than the $V_{BAT}$ supply. Illustratively, in the situation in which the tip conductor is at −5 volts, the ring conductor is at −80 volts in order to assure adequate tip-ring loop operation at maximum anticipated loop range. This type of setting takes into account such factors as direct current overhead offset voltage for amplifiers 31, 32, peak longitudinal voltage that must be balanced, and the peak voice signal to be handled in the amplifiers 31, 32 without clipping.

Output from the summer 127 is passed through a piecewise linear transfer function circuit, i.e., function generator 128, which shapes the direct current load line curve for the overall line interface circuit. This shaping is done to reduce power requirements and dissipation by limiting the available current, e.g., when serving short loops, to the maximum needed for proper operation. Function generator 128 includes two operational amplifiers 136 and 137, both having their individual noninverting input connections coupled to ground for reference purposes. Input signals are applied to the respective amplifiers through series resistors 139 and 140. For low positive input signals, i.e., less than the drop across a pair of diode junctions, such as in the diode pair 142, diode 144 is biased on; and amplifier 137 provides insufficient output to turn on its output diode 141 as its gain is zero. Function generator output is then determined by the gain of operational amplifier 136. That gain is fixed by the resistance ratio of its feedback resistor 146 to series input resistor 139.

For input signals of larger positive magnitudes, the amplifier 137 output drives diode 141 into conduction and diode 144 off with gain determined by $R_{143}/R_{140}$. The output of the function generator is then determined at a less steep slope by a combination of the resistance ratio $R_{146}/R_{139}$, reduced by a ratio comprising the product of resistances of feedback resistor 146 and resistor 143 divided by the product of the resistances of resistors 140 and 147. Because such positive input signals cause amplifier 137 to bias diode 141 on, conduction through that diode reduces the feedback signal through amplifier 136 and thereby limits the feedback to summer 28. Overall output from the function generator 128 is the direct current feedback which is applied on a lead 138 to an input of the FIG. 1 summer 28.

Figure 8:
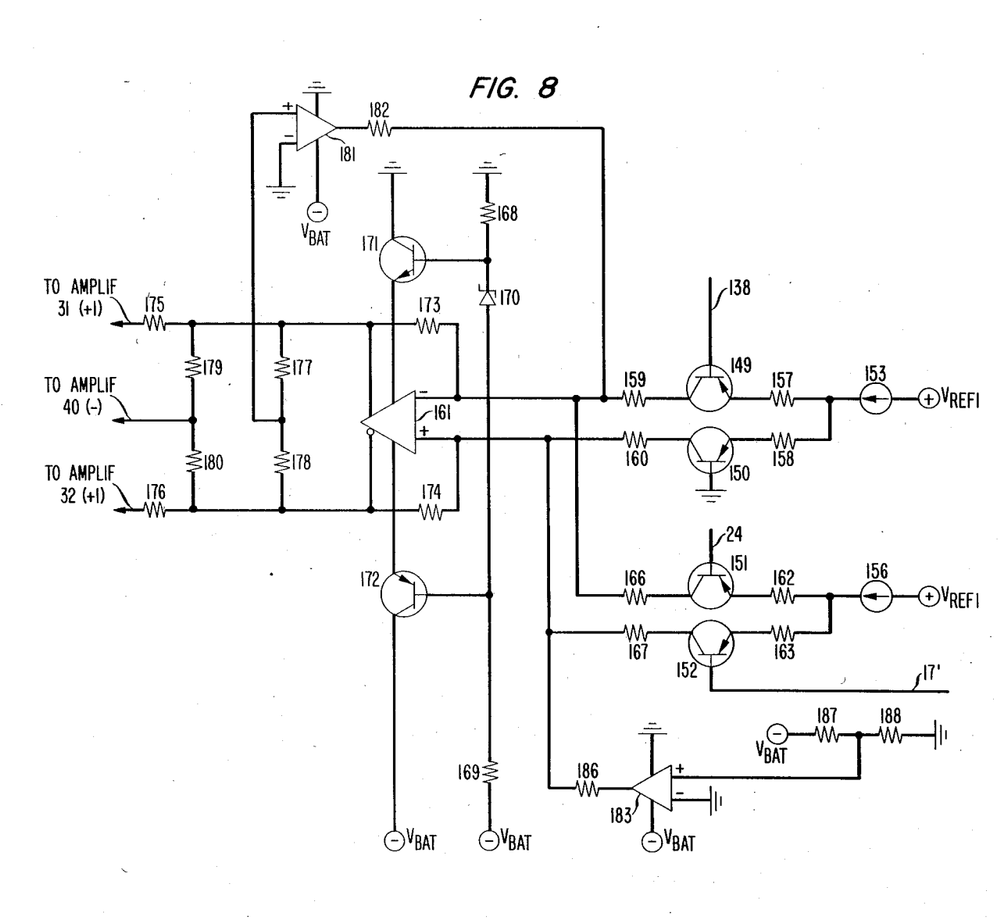
FIG. 8 is a diagram of a differential amplifier used in FIG. 1.

FIG. 8 is a more detailed diagram of the difference amplifier 25 utilized in FIG. 1 to combine the AC feedback from circuit 24, the received signal from circuit 17, and the DC feedback signal on lead 138. This amplifier, in FIG. 8, performs the functions of the analog summer 28 and the unity gain amplifiers 29 and 30 illustrated in FIG. 1. The three signals are combined by the use of a pair of differential input transistor amplifier pairs in an arrangement somewhat similar to that previously described in connection with the switchable input operational amplifiers. Thus, four transistors 149-152 are so arranged. Transistor 150 has its base connected to ground for providing the reference input for the differential transistor pair 149, 150. The DC feedback on lead 138 is applied to the base of transistor 149, the AC feedback circuit 24 is connected to the base of transistor 151, and the received signal current from lead 17' of input circuit 17 is applied to the base of transistor 152. Each of those three inputs is referenced to ground.

A positive $V_{REF1}$ supply is provided to supply each of the differential pairs through separate current sources 153 and 156, respectively. Four equal resistors are included in the amplifier differential transistor pair which receives the feedback currents; and these include resistors 157 and 158 in series with the emitters of transistors 149 and 150, respectively, and resistors 159 and 160 in series with the collectors of those transistors. Resistors 159 and 160 are further connected to the inverting and noninverting input connections of an amplifier 161, which provides the main differential amplification; and the biasing connections, to be described, for the latter amplifier provide the ground return path for the operating voltage supplies for transistors 149-152. Similar connections, including resistors 162, 163, 166, and 167 are provided for the differential transistor pair 151, 152 which accommodates the received signal from circuit 17 in FIG. 1. In this case, however, the resistor 166 connects the collector of reference transistor 151 to the inverting input connection of amplifier 161, which also received the direct input transistor 149 collector signal from the feedback current input. Similarly, the collector of transistor 152 is connected to the noninverting input of amplifier 161 along with the collector of transistor 150. This difference in connection, as between the two differential transistor pairs, effects the analog signal subtraction of both the DC feedback on lead 138 and the AC feedback on lead 24 from the received signal current; and the result is in differential current form at the inputs to amplifier 161.

Amplifier 161, in an embodiment constructed, was designed for operation on a 30-volt supply; but, in this application, it is necessary for it to operate from the $V_{BAT}$ supply, which, as previously indicated, is at approximately −85 volts. In order to accommodate this difference, a potential divider, including equal resistors 168 and 169, and a voltage breakdown diode 170, are connected in series across the $V_{BAT}$ supply. Diode 170 has a reverse conduction potential difference of 30 volts. The terminals of the breakdown diode 170 are connected to base electrodes of complementary conductivity transistors, such as the NPN transistor 171 and a PNP transistor 172, which are connected in series with the operating potential supply path of amplifier 161 across the $V_{BAT}$ supply.

Amplifier 161 is provided with complementary, or differential, outputs. A first, or true, output is coupled through a feedback resistor 173 to the inverting input of the amplifier, and the complementary output is coupled through a feedback resistor 174 to the noninverting input of the amplifier. Those two outputs are also coupled to (+1) noninverting input connections of tip and ring amplifiers 31 and 32, respectively, for driving those amplifiers in accordance with the difference between the combination of the AC and DC feedback signals and the received signal.

Two voltage dividers, containing equal resistors 177-180 and connected between outputs of amplifier 161, provide separate $V_{BAT}/2$ supplies for use in the interface. The intermediate connection between resistors 179 and 180 is connected to the inverting input connection (−) of common mode feedback amplifier 40 in FIG. 1. This connection applies negative $V_{BAT}/2$ voltage to the amplifier 40 so that gain is limited by the ratio of resistances of resistor 45 to the parallel combination of resistors 179 and 180, rather than the much larger open loop gain of the amplifier, thus providing a predetermined common-mode impedance through amplifiers 31 and 32. The amplifiers 31 and 32 are thereby held within their linear operating range for the expected range of amplifier output signals required.

The intermediate connection between resistors 177 and 178 is applied to the noninverting (+) input of a differential current driver operational amplifier 181, which is also working from the $V_{BAT}$ supply, and which has its output applied through a resistor 182 to the inverting input connection of amplifier 161. A similar differential current driver arrangement, including an amplifier 183 and a resistor 186, is provided for the noninverting input connection (+) of amplifier 161; but, in this case, the amplifier 183 is driven from a separate potential divider across $V_{BAT}$ and including resistors 187 and 188. This biasing arrangement for the input leads for amplifier 161 holds them at the $-V_{BAT}/2$ level in the absence of signal, and causes input signal variations to drive the amplifier true and complement outputs symmetrically in opposite directions with respect to that voltage level, thereby maintaining good balance for the drives for the tip and ring amplifiers 31 and 32 in the interface.

Although the line interface unit of the present invention has been described in connection with a particular application thereof, it is to be understood that additional embodiments, modifications, and applications which will be obvious to those skilled in the art, are included within the spirit and scope of the invention.

What is claimed is:

1. In a telephone line interface circuit having first and second connections for respective tip and ring conductors of a telephone line, and first and second differential input amplifiers through which line feed current is supplied to said first and second connections, respectively, the improvement comprising a common mode circuit connected to said first and second connections for supplying substantially equal reference signals to said amplifiers, a third connection for applying a predetermined fixed bias voltage to said common mode circuit, and means for switching said common mode circuit to be responsive either to a voltage difference between said first and second connections, in a loop-start mode, or to a voltage on said third connection, in a ground-start mode.

2. The line interface circuit in accordance with claim 1 in which said means for switching comprises first means, responsive to signals received at said first and second connections, for coupling an input of said common mode circuit to said first and second connections, in said loopstart mode, and second means, responsive to signals received at said first and second connections, for coupling input of said common mode circuit to a voltage on said third connection, in said ground-start mode.

3. The line interface circuit in accordance with claim 2 in which said means for switching comprises means for controlling said first and second means for coupling, said means for controlling comprising first and second sensing resistors each connected in series in a different one of said first and second connections, separate means for sensing a voltage difference across each of said sensing resistors, means for shifting each of said voltage differences to a predetermined voltage range, and means for utilizing output signals of said means for shifting to control said first and second means for coupling.

4. The line interface circuit in accordance with claim 1 in which said means for switching comprises a switchable input operational amplifier having selectable first and second inputs, a reference input, a selection input, and an output, and there are provided first means connecting said voltage difference to said first selectable input, seconde means, connecting said predetermined fixed bias to said second selectable input, means having a first predetermined resistance for coupling said output to said reference input, means having a second predetermined resistance for coupling a reference voltage to said reference input, said first and second resistances being proportioned to limit the gain of said operational amplifier to a level sufficiently below the open loop gain thereof to keep said first and second amplifiers within linear operating ranges thereof for a predetermined range of said first and second connection signals and to present a predetermined common-mode impedance to those connections, and means, responsive to outputs of said first and second amplifiers, for selecting said first input in said loop-start mode and said second input in said ground-start mode.

5. The line interface circuit in accordance with claim 4 in which there are provided means for receiving signals to be applied through said first and second differential input amplifiers to said first and second connections, said means for receiving including a differential amplifier having first and second complementary output connections, means for coupling said first and second complementary output connections to said first inputs of said first and second differential input amplifiers, respectively, and said reference voltage coupling means comprises means for coupling an average of signals at said first and second complementary output connections to said reference input.

6. The line interface circuit in accordance with claim 1 in which each of said amplifiers comprises a switchable input operational amplifier having first and second selectable inputs and a reference input, means for connecting an output of such operational amplifier to said first input for causing such operational amplifier to operate as a voltage-controlled current source, means connected to said second input for applying a fixed voltage bias of predetermined value for causing such amplifier to operate as a voltage-controlled voltage source, means for coupling an output of said common mode circuit to said reference input, and means, responsive to said means for switching, for switching said amplifier to be responsive to predetermined different ones of its first and second inputs in said loop-start mode and said ground-start mode, respectively.

7. The line interface circuit in accordance with claim 6 in which each of said switchable input operational amplifiers comprises an output amplifier stage for converting a balanced input signal to an unbalanced with respect to ground output signal, first and second differentially connected amplifier pairs, each having a first differential-input connection to a different one of said first and second selectable inputs, a second differential-input connection to said reference input, and said first and second amplifier pairs having a common power supply return path, selectable first and second current sources connected for applying a power supply output to said amplifier pairs, respectively, means in said means for switching for selecting said first current source in said loop-start mode and said second current source in said ground-start mode, and means for connecting outputs of said amplifier pairs as multipled balanced input signals to said output amplifier stage.

8. The line interface circuit in accordance with claim 7 in which each of said amplifier pairs comprises first and second transistors each connected to have a base as a different one of said first and second differential-input connections, and first and second diodes connecting one of said current sources to both of said transistors, each said diode being poled for forward conduction of current from such current source to its transistor and poled to block current flow between said transistors.

9. The line interface circuit in accordance with claim 6 in which said switchable input operational amplifiers each includes means for presenting at its output a high impedance in said loop-start mode and a low impedance in said ground-start mode, and said means for switching includes an additional switchable input operational amplifier having first and second selectable inputs and a reference input and which comprises means for coupling a signal, which is a function of the voltage difference between said tip and ring conductors, from its first selectable input to said first and second amplifiers as said reference signal with a low impedance in said loop-start mode and for coupling from its second selectable input said fixed voltage bias with a high impedance as said reference in said ground-start mode.

10. The line interface circuit in accordance with claim 9 in which each of said switchable input operational amplifiers comprises

- an output amplifier stage for converting a balanced input signal to an unbalanced with respect to ground output signal,
- first and second differentially connected amplifier pairs, each having a first differential-input connection to a different one of said first and second selectable inputs, a second differential-input connection to said reference input, and said first and second amplifier pairs having a common power supply return path,
- selectable first and second current sources connected for applying a power supply output to said amplifier pairs, respectively,
- means in said means for switching for selecting one or the other of said first and second current sources in said loop-start and ground-start modes, respectively, and
- means for connecting outputs of said amplifier pairs as balanced input signals to said output amplifier stage.

11. The line interface circuit in accordance with claim 10 in which each of said amplifier pairs comprises

- first and second transistors each connected to have a base as a different one of said first and second differential-input connections, and
- first and second diodes connecting one of said current sources to both of said transistors, each said diode being poled for forward conduction of current from such current source to its transistor and poled to block current flow between said transistors.

12. The line interface circuit in accordance with claim 5 in which said means for switching comprises

- separate means for sensing current in a different one of said first and second connections, and
- means, responsive to outputs of said sensing means, for controlling said common mode circuit in accordance with different predetermined combinations of current levels in said first and second connections.

13. The line interface circuit in accordance with claim 12 in which said means for controlling comprises

- means for detecting changes in an output of said first or second connection means for sensing current with respect to a first reference voltage to indicate flow of said line feed current in only one of said first or second connections,
- means for detecting changes in an average of outputs of both of said first and second connection means for sensing current with respect to a second reference voltage to indicate flow of said line feed current in both of said first and second connections, and
- means, responsive to outputs of said means for detecting, to control said common mode circuit.

* * * * *

UNITED STATES PATENT AND TRADEMARK OFFICE
CERTIFICATE OF CORRECTION

PATENT NO. : 4,563,547

DATED : January 7, 1986

INVENTOR(S) : Paul N. Booth

It is certified that error appears in the above-identified patent and that said Letters Patent is hereby corrected as shown below:

Column 17, line 20, insert --an-- after "coupling".
Column 17, line 44, "seconde" should read --second--.

Signed and Sealed this

Twenty-fourth Day of June 1986

[SEAL]

Attest:

Attesting Officer

DONALD J. QUIGG

Commissioner of Patents and Trademarks